United States Patent
Di Luca (10) Patent No.: US 11,320,906 B2
(45) Date of Patent: May 3, 2022

(54) SYSTEMS AND METHODS FOR DELIVERING A PLURALITY OF HAPTIC EFFECTS

(71) Applicant: Facebook Technologies, LLC, Menlo Park, CA (US)

(72) Inventor: Massimiliano Di Luca, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 40 days.

(21) Appl. No.: 16/714,212

(22) Filed: Dec. 13, 2019

(65) Prior Publication Data

US 2021/0181845 A1 Jun. 17, 2021

(51) Int. Cl.
*G06F 3/01* (2006.01)
*H02K 33/18* (2006.01)
*G08B 6/00* (2006.01)

(52) U.S. Cl.
CPC .............. *G06F 3/016* (2013.01); *G06F 3/014* (2013.01); *G08B 6/00* (2013.01); *H02K 33/18* (2013.01)

(58) Field of Classification Search
CPC ........... G06F 3/014; G06F 3/016; G08B 6/00; H02K 33/18; H01H 2051/2218; H01H 51/2209; H01H 51/2227; H01H 51/2245; H01H 50/54; H01H 1/00
USPC ............ 340/407.1, 407.2; 335/126, 131, 132
See application file for complete search history.

(56) References Cited

U.S. PATENT DOCUMENTS

| | | | |
|---|---|---|---|
| 4,136,293 A | 1/1979 | Patel | |
| 4,318,145 A | 3/1982 | Frandsen | |
| 4,692,999 A | 9/1987 | Frandsen | |
| 4,868,432 A | 9/1989 | Frandsen | |
| 5,345,206 A | 9/1994 | Morcos | |
| 6,159,013 A * | 12/2000 | Parienti | A61F 9/08 434/112 |
| 7,339,578 B2 | 3/2008 | Hafez et al. | |
| 9,780,634 B2 | 10/2017 | Neff et al. | |
| 9,886,093 B2 * | 2/2018 | Moussette | G06F 3/016 |
| 9,928,950 B2 * | 3/2018 | Lubinski | H01F 7/12 |
| 2002/0135447 A1 * | 9/2002 | Gruner | H01H 51/2209 335/132 |
| 2006/0164383 A1 * | 7/2006 | Machin | G06F 3/0338 345/156 |
| 2008/0037814 A1 * | 2/2008 | Shau | H04R 1/22 381/337 |

(Continued)

FOREIGN PATENT DOCUMENTS

JP 4652058 B2 3/2011

*Primary Examiner* — Quan Zhen Wang
*Assistant Examiner* — Mancil Littlejohn, Jr.
(74) *Attorney, Agent, or Firm* — Foley & Lardner LLP (57) ABSTRACT

A haptic device including a magnet, a rigid and conductive material arranged with respect to the magnet so as to create a gap between the magnet and the rigid and conductive material is disclosed. The haptic device is configured such that a magnetic field is generated in the gap by the magnet. The haptic device also includes a plurality of coils each connected to a respective one of a plurality of protruding elements where each of the plurality of coils are configured to be positioned within the gap. Each of the plurality of protruding elements are configured to produce a respective contact with an object when the respective coil is energized. In some embodiments, the object is a hand of a user.

20 Claims, 6 Drawing Sheets

(56) References Cited

U.S. PATENT DOCUMENTS

| | | | |
|---|---|---|---|
| 2012/0328147 A1* | 12/2012 | Kim | H04R 9/025 |
| | | | 381/400 |
| 2013/0328431 A1 | 12/2013 | Teo et al. | |
| 2015/0109223 A1 | 4/2015 | Kessler et al. | |
| 2016/0086458 A1* | 3/2016 | Biggs | A61B 5/6815 |
| | | | 381/151 |
| 2019/0261092 A1* | 8/2019 | Landick | G06F 1/1688 |

* cited by examiner

SYSTEMS AND METHODS FOR DELIVERING A PLURALITY OF HAPTIC EFFECTS

FIELD OF THE DISCLOSURE

The present disclosure relates generally to a haptic system. More particularly, the present disclosure relates to systems and methods for delivering multiple types of haptic stimulation using a magnet.

BACKGROUND

The present disclosure relates generally to haptic systems. Haptic systems or devices may be utilized in a variety of electronic devices. For example, a haptic system or device may be utilized to provide a user of a virtual reality (VR), augmented reality (AR), or mixed reality (MR) system with tactile feedback based on the state of the system. For example, a haptic device may be utilized to provide a user with tactile feedback based on the user's input. In other examples, the haptic device may be able to convey information to a user by producing tactile sensory outputs. The haptic device provides a user with more in depth stimulation that may not otherwise be provided.

SUMMARY

One implementation of the present disclosure is related to a haptic device, according to some embodiments. The haptic device includes a magnet and a rigid and conductive material arranged with respect to the magnet so as to create a gap. The gap is configured such that a magnetic field is generated in the gap by the magnet. The haptic device also includes a plurality of coils in the gap, each of the plurality of coils connected to a respective one of a plurality of protruding elements, and each of the plurality of protruding elements being configured to produce a respective contact with an object when the respective coil is energized. In some embodiments, each coil is made of an electrically-conductive wire that is spooled into a cylindrical shape. In some embodiments, each coil is secured by a centering mechanism that is configured to cause the coil to move axially in the gap when it is energized with respect to the cylindrical shape. In some embodiments, the plurality of coils are arranged coaxially together in the gap. In some embodiments, each coil is configured to be energized independently of the other coils. In some embodiments, the object is a person, and wherein the respective contact is contact with respective locations on the person. In some embodiments, the object is a person, where the respective contact is a contact that is substantially orthogonal to a respective location on the person's skin. In some embodiments, the object is a person, where the respective contact is a contact that is substantially parallel to a respective location on the person's skin.

In another implementation a method of operating a device having a magnet, rigid and conductive material arranged with respect to the magnet so as to create a gap, and configured such that a magnetic field is generated in the gap by the magnet, and a plurality of coils in the gap, where each of the plurality of coils is connected to a respective one of a plurality of protruding elements is disclosed. The method includes energizing a first one of the plurality of coils so as to cause a first one of the plurality of protruding elements to produce a first respective contact with an object and energizing a second one of the plurality of coils so as to cause a second one of the plurality of protruding elements to produce a second respective contact with the object. In some embodiments, each coil is comprised of an electrically-conductive wire that is spooled into a cylindrical shape. In some embodiments, each coil is secured by a centering mechanism that is configured to cause the coil to move axially in the gap when it is energized with respect to the cylindrical shape. In some embodiments, the plurality of coils are arranged coaxially together in the gap. In some embodiments, the object is a person, where the respective contact is contact with respective locations on the person. In some embodiments, the object is a person, where the respective contact is a contact that is substantially orthogonal to a respective location on the person's skin. In some embodiments, the object is a person, where the respective contact is a contact that is substantially parallel to a respective location on the person's skin.

In another implementation, a wearable device includes a magnet and a rigid and conductive material arranged with respect to the magnet so as to create a gap. The gap is configured such that a magnetic field is generated in the gap by the magnet. The haptic device also includes a plurality of coils in the gap, each of the plurality of coils connected to a respective one of a plurality of protruding elements, and each of the plurality of protruding elements being configured to produce a respective contact with an object when the respective coil is energized. In some embodiments, the respective contacts are configured to produce a contact at respective locations on the person. In some embodiments, the respective contact is a contact that is substantially orthogonal to a respective location on the person's skin. In some embodiments, the respective contact is a contact that is substantially parallel to a respective location on the person's skin. In some embodiments, the respective contact is a vibration produced on respective locations on the person.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Referring generally to the FIGURES, systems and methods for haptic systems are shown, according to some embodiments. In some embodiments, a haptic system includes a haptic device and processing circuitry. The haptic device includes a magnet and a rigid and conductive element positioned such as to create a gap therebetween. The gap has a magnetic field generated therein by at least the magnet. The haptic device may also include a plurality of coils each attached to a protruding element. The plurality of coils and protruding element are designed such that the coils may be positioned within the gap. In this way, when one of the coils is energized (e.g., induced with a current), the coil is mobilized and thereby causes the respective protruding element to extend further from the haptic device. The movement of the respective protruding element may then impact or otherwise move such as to create a tactile effect on a corresponding object (e.g., a finger or hand of a user). Similarly, when a second one of the coils is energized, the second coil is mobilized and thereby causes a respective second protruding element to extend further away from the haptic device. The movement of the respective second protruding element may then impact or otherwise move such as to create a tactile effect on a corresponding object in a different location than the protruding element associated with the first one of the coils. In this way, the haptic device can selectively create multiple different haptic effects based on a selection of which coil to energize. Thus, the haptic device provides a robust way of providing a variety of different haptic or tactile effects with a reduced need for multiple actuators.

The protruding elements and the coils may be arranged in a certain geometry in which the weight, size, or material of the protruding elements are designed to cause certain haptic effects at respective locations around or relative to the magnet. In some embodiments, the haptic system may be implemented in various form factors. For example, the haptic system may include multiple haptic devices. The haptic devices may be implemented arranged on in the form of a glove, bracelet, arm band, keyboard, tactile display, other wearable forms, or other forms that may be contactable with a user's skin. Further, the haptic system may be implemented or connectable to various electronic devices. For example, the haptic system may be implemented with a virtual reality (VR) system, augmented reality (AR) system, or mixed reality (MR) system. In some embodiments, the haptic system may be implemented with electronic devices such as personal computers or gaming systems.

Figure 1:
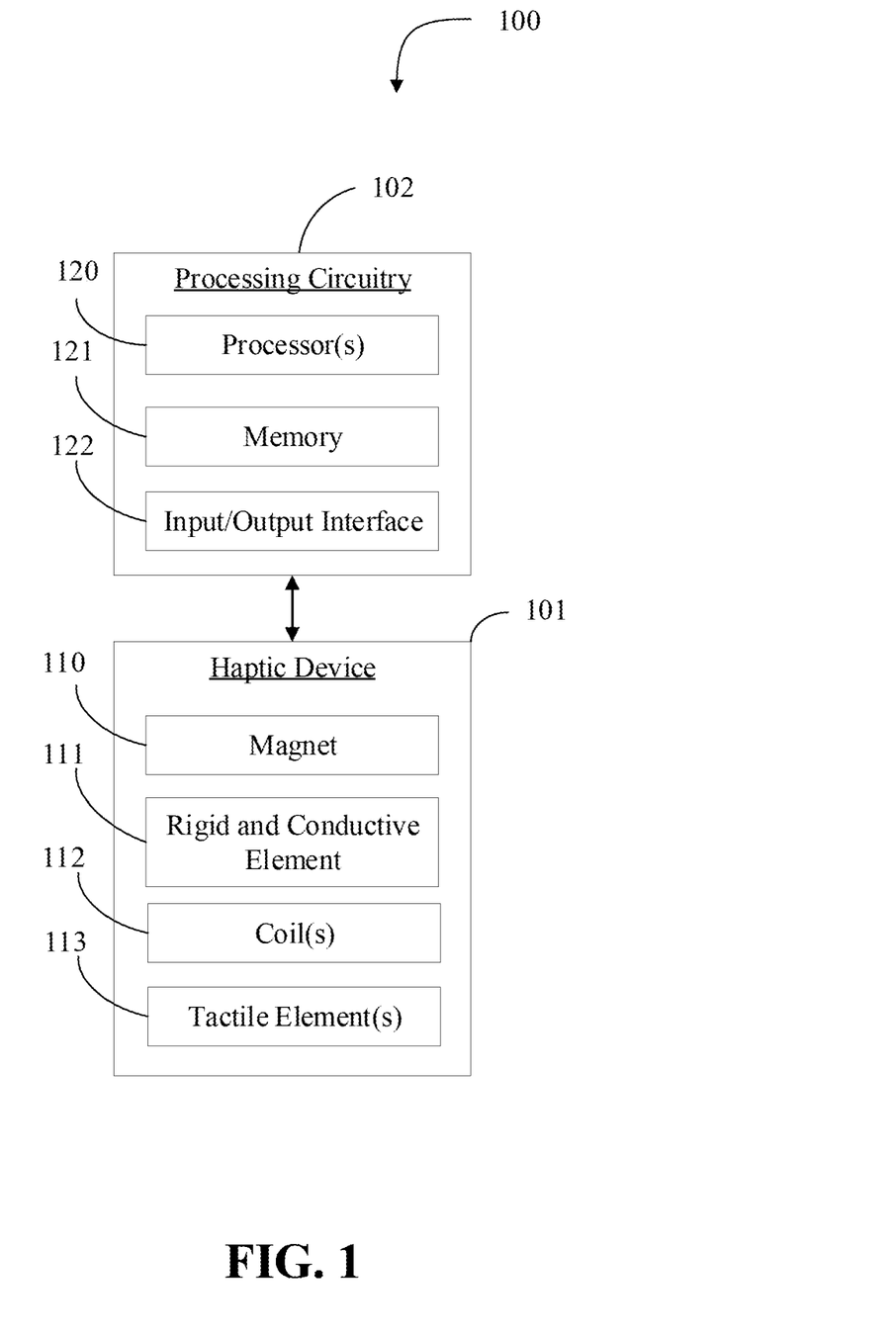
FIG. 1 is a block diagram of a haptic system in accordance with an illustrative embodiment.

Referring now to FIG. 1, a block diagram of a haptic system 100 is shown. The haptic system 100 includes processing circuitry 102 and a haptic device 101. In some embodiments, more than one haptic device 101 may be used or implemented within the haptic system 100. In some embodiments, the haptic device 101 may be integrated in various forms such as a glove or tactile keyboard having multiple haptic devices therein.

The haptic device 101 includes a magnet 110 and a rigid and conductive element 111 positioned such as to create a gap therebetween. The gap has a magnetic field therein generated from the magnet 110. The haptic device 101 also includes multiple coils 112 each affixed or coupled to one of multiple tactile elements 113. In some embodiments, each of the tactile elements 113 include one or more protruding elements that are configured to produce a respective contact (e.g., and haptic or tactile effect) with an object when the respective coil is energized.

The processing circuitry 102 may include a processor 120, a memory 121, and an input/output interface 122. In some embodiments the processing circuitry 102 may be integrated with various electronic devices. For example, in some embodiments, the processing circuitry 102 may be integrated with a wearable device such as a head worn display, smart watch, wearable goggles, or wearable glasses. In some embodiments, the processing circuitry 102 may be integrated with a gaming console, personal computer, server system, or other computational device. In some embodiments, the processing circuitry 102 may also include one or more processors, microcontrollers, application specific integrated circuit (ASICs), or circuitry that are integrated with the haptic device 101 and are designed to cause or assist with the haptic device 101 in performing any of the steps, operations, processes, or methods described herein.

The processing circuitry 102 may include one or more circuits, processors 120, and/or hardware components. The processing circuitry 102 may implement any logic, functions or instructions to perform any of the operations described herein. The processing circuitry 102 can include memory 121 of any type and form that is configured to store executable instructions that are executable by any of the circuits, processors or hardware components. The executable instructions may be of any type including applications, programs, services, tasks, scripts, libraries processes and/or firmware. In some embodiments, the memory 121 may include a non-transitory computable readable medium that is coupled to the processor 120 and stores one or more executable instructions that are configured to cause, when executed by the processor 120, the processor 120 to perform or implement any of the steps, operations, processes, or methods described herein. In some embodiments, the memory 121 is configured to also store, with a database, information regarding the localized position of each of the coils 112 and the respective tactile elements 113 on the haptic device 101 along with the respective protruding elements on each of the tactile elements. That is, the memory 121 may have a database that indicates the respective tactile or haptic effects that energized particular coils 111 are designed to cause at respective locations on an object.

In some embodiments, input/output interface 122 of the processing circuitry 102 is configured to allow the processing circuitry 102 to communicate with the haptic device 101 and other devices. In some embodiments, the input/output interface 122 may be configured to allow for a physical connection (e.g., wired or other physical electrical connection) between the processing circuitry 102 and the haptic device 101. In some embodiments, the input/output interface 122 may include a wireless interface that is configured to allow wireless communication between the haptic device 101 (e.g., a microcontroller on the haptic device 101 connected to leads of the one or more coils) and the processing circuitry 102. The wireless communication may include a Bluetooth, wireless local area network (WLAN) connection, radio frequency identification (RFID) connection, or other types of wireless connections. In some embodiments, the input/output interface 122 also allows the processing circuitry 102 to connect to the internet (e.g., either via a wired or wireless connection). In some embodiments, the input/output interface 122 also allows the processing circuitry 102 to connect to other devices such as a display, audio system, multiple haptic devices 101, or other devices that may affect the intended stimulation that is to be delivered by the haptic system 100.

Figure 2:
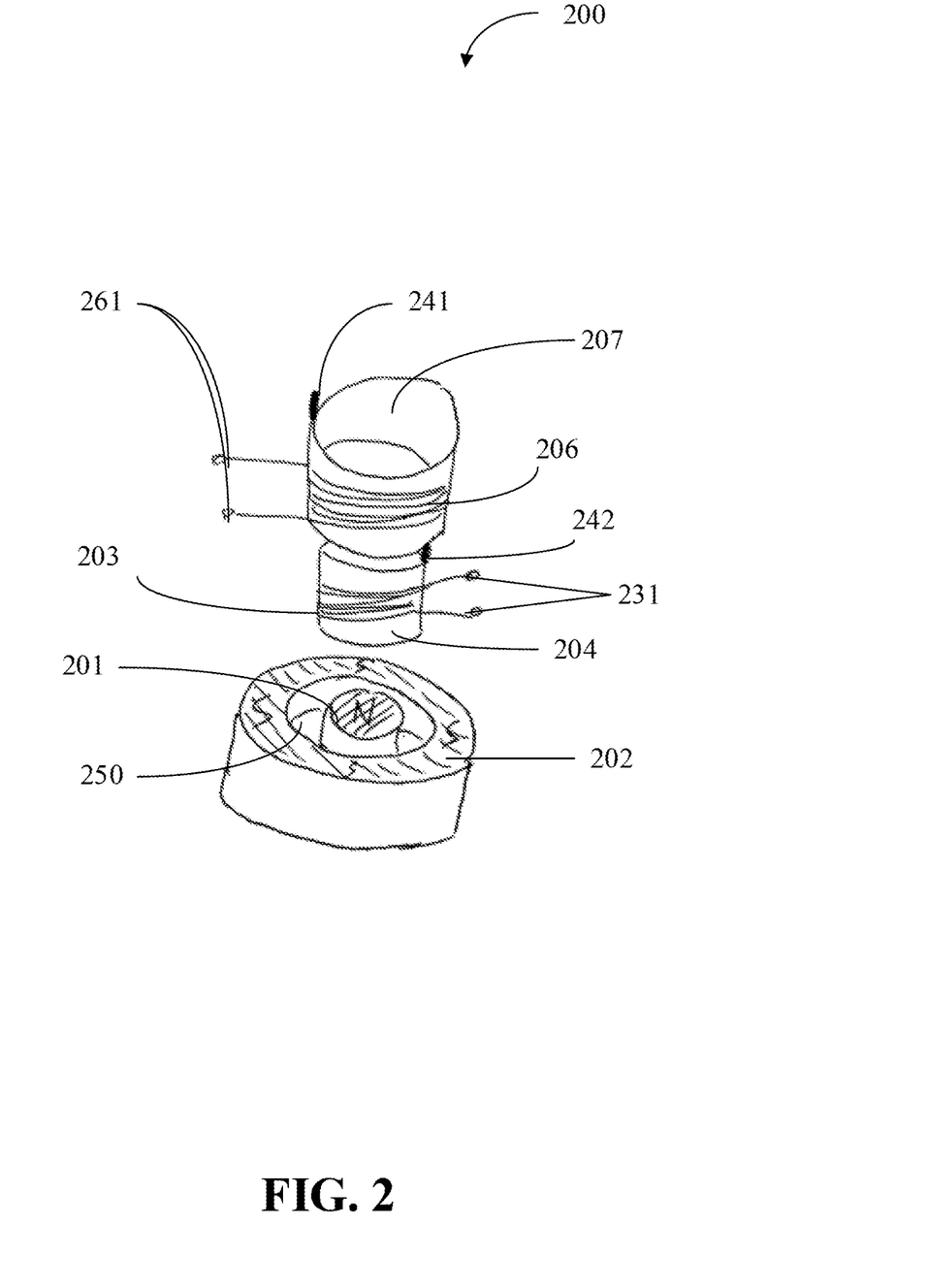
FIG. 2 is a breakout view of a haptic device in accordance with an illustrative embodiment.

Referring now to FIG. 2, a breakout view of a haptic device 200 is shown in accordance with an illustrative embodiment. The haptic device 200 may be similar to, or implemented as, the haptic device 101 described in reference to FIG. 1. The haptic device 200 includes a magnet 201 and a rigid and conductive material 202 positioned relative to one another such as to create a gap 250 therebetween. The gap 250 having a magnetic field generated therein by at least the magnet 201. In some embodiments, the magnet 201 and the rigid and conductive material 202 may be affixed to a substrate or other base (not shown) that is configured to hold the magnet 201 and rigid and conductive element in place relative to one another.

The haptic device 200 also includes a first coil 203 coupled to a first tactile element 204. The first tactile element 204 includes a first protruding element 240 coupled thereto. The first protruding element 240 is designed to contact (or transfer other sensory sensation to, perhaps in cooperation with structures or portions of protruding elements 240 not shown) an object (e.g., hand of a user) at a first location of the object. The haptic device 200 also includes a second coil 206 coupled to a second tactile element 207. The second tactile element 207 includes a second protruding element 241 coupled thereto. The second protruding element 241 is designed to contact (or transfer other sensory information to) an object (e.g., hand of a user) at a second location of the object. In some embodiments, there may be more or fewer coils and respective tactile elements deployed or implemented with the haptic device 200. In some embodiments, each tactile element 204 and 207 may include additional protruding elements. In some embodiments, the protruding elements may be of any size, length, width, or have an feature at a distal end away from a respective tactile element such as to relay different haptic effects to an object at various locations of the object.

The first coil 203 may also include leads 231 that are configured to attach to a corresponding element that is designed to selectively energize (e.g., induce a current in) the first coil 203. The second coil 206 may also include leads 261 that are configured to attach to a corresponding element that is designed to selectively energize (e.g., induce a current in) the first coil 203. In some embodiments, the corresponding element that is designed to selectively energize the first coil 203 and the second coil 206 is a microcontroller or other processing device located locally with the haptic device 101 (e.g., on the same substrate or mechanically coupled to a device that also connects to the haptic device 101). In some embodiments, the coils 203 and 206 are electrically insulated copper wires. In some embodiments, the coils 203 and 206 are any conductive wires. In some embodiments, the coils 203 and 206 are conductive wires having an electrically insulated sheath that prevent one or more of the windings from electrically shorting. In some embodiments, the coils 203 and 206 are conductive wires or other conductive devices (e.g., waveguides) that are formed within or enclosed within respective tactile elements 204 and 207. For example, in some embodiments, conductive elements (e.g., wires) may be spooled to form a coil, the coil may then be covered with a molding material (e.g., epoxy or a liquefied polymer) and when the molding material has hardened or dried, the coil and respective tactile element may be formed of a single structure.

In some embodiments, the first and second tactile elements 204 and 207 may be cylindrically shaped having a hollow center. In some embodiments, the first and second tactile elements 204 and 207 may be of any shape that allows for respective coils to be affixed to or coupled to the tactile element 204 and 207 such that the respective coils can be positioned within the gap 250. In some embodiments, the first and second tactile elements 204 and 207 are made from a rigid, insulated material. In some embodiments, the first and second tactile elements 204 and 207 may be made from plastic, metal, alloys of metals, ceramic, or any combination thereof.

In some embodiments, the protruding elements 241 and 242 are mechanically affixed or coupled to respective tactile elements. In some embodiments, the protruding elements 241 and 242 are removable or repositionable on respective tactile elements. In some embodiments, the protruding elements 241 and 242 are formed as part of the respective tactile elements. In some embodiments, the protruding elements 241 and 242 are made from the same material as the respective tactile elements. In some embodiments, the protruding elements 241 and 242 are formed from different material than respective tactile elements. For example, in some embodiments, the protruding elements 241 and 242 may be made from rubber, plastic, metal, alloys of metals or any combination thereof. In some embodiments, each of the protruding elements may be made from a composition that is different than compositions of other protruding elements such that particular protruding elements can be used to create particular haptic or tactile effects. In some embodiments, each of the protruding elements may be of different sizes, shapes, or have different ends (e.g., rounded or squared off) such as to create particular or different haptic effects when impacting or touching an object. In some embodiments, each tactile element may have one or more protruding elements each positioned at different locations on the tactile element and each having respective shapes, sizes, or ending types.

In some embodiments, the magnet 201 may be cylindrically shaped and the rigid and conductive material 202 may be cylindrically shaped having a hollow center. In some embodiments, a radius of the magnet is smaller than a radius of the hollow center of the rigid and conductive material such as to create the gap 250. In some embodiments, the gap 250 has a constant distance between the magnet 201 and the rigid and conductive material 103. In some embodiments, the cylindrically shaped magnet 201 and the cylindrically shaped rigid and conductive element 202 are concentrically centered such that a thickness of the gap 250 is consistent throughout various portions of the gap 250. In some embodiments, the magnet 201 and the rigid and conductive material 202 are mounted to a rigid substrate (i.e., a base) (not shown) that is configured to maintain the relative positioning of the magnet 201 and the rigid and conductive material 202. In some embodiments, the rigid substrate may have various holes that are configured to allow the leads 231 and 261 of respective coils 203 and 206 to extend through and connect to an element that is configured to energize the respective coils 203 and 206. In some embodiments, the leads 231 and 261 may be encapsulated or enclosed within the rigid substrate and extend to a position where ends of the leads 231 and 261 may extend from the rigid substrate or connect directly to the element configured to energize the respective coils (e.g., a microcontroller). In some embodiments, one or more elements (e.g., pads, waveguides, or wires) may be used to electrically connect or coupled each respective lead 231 and 261 to the element configured to energize the respective coil 203 and 206.

In some embodiments, the magnet 201 and rigid and conductive material 202 may be of any shape that allows for a positioning that creates a gap therebetween and allows for a magnetic field to be generated within the gap. For example, in some embodiments, the magnet 201 may be square shaped or rectangular shaped and the rigid and conductive material 202 may be square or rectangular shaped with a hollow center. In some embodiments, the rigid and conductive material 202 may be positioned inside the magnet 201. That is, in some embodiments, the magnet 201 may be cylindrically shaped with a hollow center and the rigid and conductive material 202 may be cylindrically shaped such that the rigid and conductive material 202 may be positioned within the hollow portion of the cylindrically shaped magnet 201 and for a gap 250 to be formed therebetween. In some embodiments, or one or more magnets 201 may be used. In some embodiments, the rigid and conductive material 202 may be formed as a single piece of material. In some embodiments, the rigid and conductive material may include multiple rigid and conductive pieces that may be mechanically coupled together to form the rigid and conductive material 202. In some embodiments, the rigid and conductive material 202 is made from iron or an alloy containing iron. In some embodiments, the rigid and conductive material 202 may be formed from any rigid ferromagnetic material. In some embodiments, the ferromagnetic material may shield the magnetic field from the magnet 201 from other devices surrounding the haptic device 200. In some embodiments, the rigid and conductive material 202 may be formed of any metal, or alloy of metal that is both rigid enough to assist with the alignment of the tactile elements and the shape of the gap 250. In some embodiments, the rigid and conductive material is also a magnet of opposite polarity than the magnet 201 such that magnetic field is generated within the gap 250 by the magnet 201 and the magnetic rigid and conductive element. The rigid and conductive material 202 is used as a centering mechanism that allows the coil (and respective tactile element) to move while maintaining a lateral position of the coil and the respective tactile element.

In some embodiments, the magnet 201 is a permanent magnet made from ceramic, alnico, neodymium, other magnetic materials, or a combination thereof. In some embodiments, the magnet 201 may include one or more electromagnets configured to form magnetic field within the gap 250.

Figure 3:
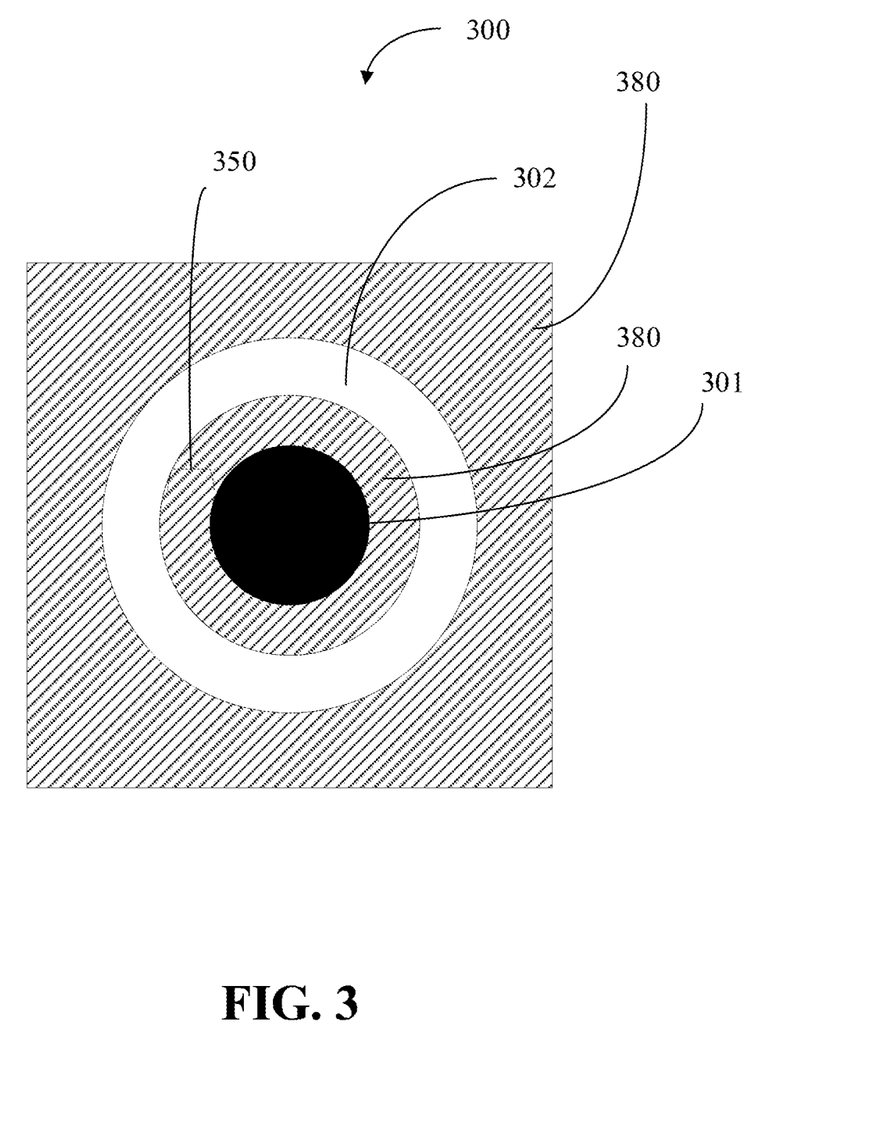
FIG. 3 is top view of a magnet and a rigid and conductive material in accordance with an illustrative embodiment.

Referring now to FIG. 3, a top view 300 of a magnet 301 and rigid and conductive element 302 is shown in accordance with an illustrative embodiment. The magnet 301 and rigid and conductive element 302 are mechanically attached or coupled to a rigid substrate 380 (e.g., a base) such that a gap 350 is formed therebetween. In some embodiments, the gap 350 has a width (e.g., shown also by the bracket 350) that in some embodiments is consistent for the entire length of the gap 350. In some embodiments, the width of the gap may vary at different portions (e.g., at the corners of an embodiment where the magnet 301 and rigid and conductive material are square or rectangular shaped). The width of the gap 350 may vary depending upon the number of tactile elements and respective coils that are to be positioned within the gap 350. That is, the width and configuration of the gap 350 may vary based on the particular application of a respective haptic device and the number of desired haptic effects the haptic device is designed to create or generate.

The magnet 301 and the rigid and conductive material 302 are concentrically positioned. For example, the magnet 301 is cylindrically shaped having a consistent radius along the center and the rigid and conductive material 302 are cylindrically shaped with a hollowed out center and the center of the cylindrical rigid and conductive material 302 may be positioned such that the center of the cylindrical rigid and conductive material 302 share a center with the center of the cylindrically shaped magnet. In some embodiments, the gap 350 has a bottom that is formed by the rigid substrate. In other embodiments, the magnet 301 and rigid and conductive material 302 may be of different shapes and still share a center or an axis.

In some embodiments, the rigid substrate 380 may be made from any rigid material including plastic, metal, metal alloy, or combination thereof that is able to keep the magnet 301 and the rigid and conductive material 302 stationary relative to one another. In some embodiments, the rigid substrate 380 may have one or more haptic devices (e.g., and thereby magnets and rigid and conductive elements) affixed or coupled thereon. In some embodiments, the rigid substrate (i.e., base) is configured to mechanically affix to one or more springs or elastic components that are also connected to respective tactile elements or coils. The springs may act as a centering device and keep the respective tactile elements from spinning, keep the respective tactile elements from extending too far (e.g., too far that the alignment of the tactile element leaves the gap and becomes dis-aligned), and assist with bringing a de-energized tactile element back to an initial position. For example, the spring or elastic element may pull the respective tactile element back toward the base after the coil of the respective tactile element has been de-energized.

In some embodiments, the rigid substrate 380 defines a bottom of the gap 350. A depth of the gap 350 may extend from the bottom (e.g., from the substrate 380) to a position where the magnet 301 and the rigid and conductive material 302 no longer have an area therebetween. The depth of the gap 350 may be large enough such that a coil having multiple windings on a respective tactile element may be positioned within the gap and each winding or at least a portion (e.g., 25%) of the windings are exposed to the magnetic field within in the gap 350. In some embodiments, the depth of the gap 350 is large enough such that the protruding elements are recessed within the gap when respective tactile elements are at an initial position.

Figure 4:
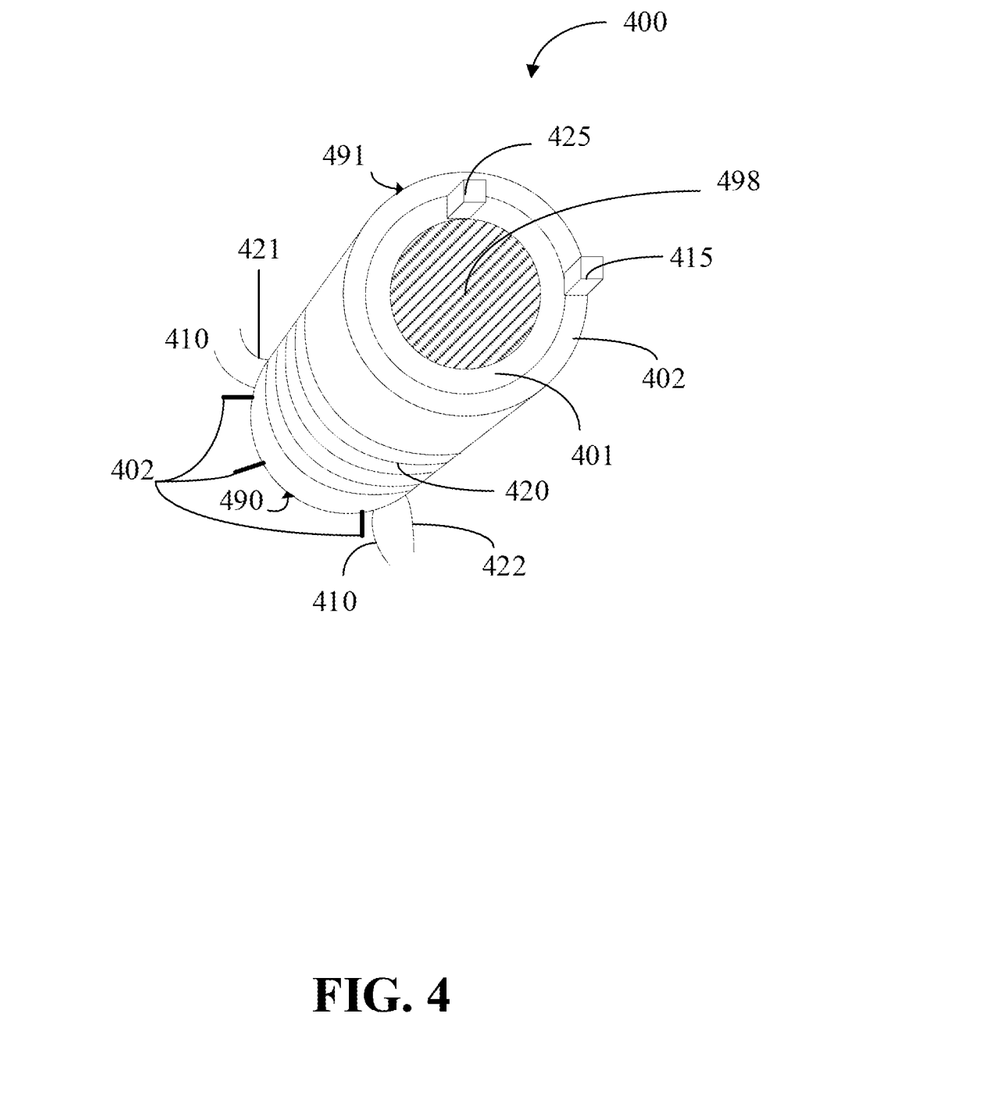
FIG. 4 is an isometric view of protruding elements and coils accordance with an illustrative embodiment.

Referring now to FIG. 4, an isometric view of a device 400 having multiple coils and multiple tactile elements is shown is accordance with an illustrative embodiment. In particular, FIG. 4 depicts a first tactile element 401 and a second tactile element 402 positioned around the first tactile element. The first tactile element 401 is mechanically coupled to a first coil 410 and the second tactile element 402 is mechanically coupled to a second coil 420. It is to be appreciated that the first coil 410 is mostly hidden from view because the first coil 410 (e.g., the windings of the first coil 410) are wrapped around the first tactile element 401 which is concentrically located within an inner radius of the second tactile element 402. Thus, for purposes of illustration, only the leads of the first coil 410 are depicted.

The first and second tactile elements 401 and 402 are similarly shaped but are if different sizes such that the first and second elements 401 and 402 may share a similar center axis. In some embodiments, the similar center axis is also configured to share the center axis of the magnet and rigid and conductive element of FIG. 3 such that coils 410 and 420 may have at least some of windings positioned within the gap. That is, in some embodiments, the first tactile element 401 is cylindrically shaped with a hollow center 498 such that the hollow center 498 of the first tactile element is configured to allow the first tactile element 401 to accept a corresponding magnet within the hollow center 498 and the second tactile element 402 is cylindrically shaped with a hollow center such that the hollow center of the second tactile element 402 may allow the first tactile element 401 to be positioned within the second tactile element 402 such that both the first and second tactile elements 401 and 402 may be positioned within a corresponding gap around the magnet. In some embodiments, the rigid material, the first and second tactile elements 401 and 402, and/or the coils may have a limiting device that may limit or restrict the amount of extension of the coils from the rigid material to a certain point or within a range and may be processor or digitally controlled. Some examples, of a mechanical limiting device may include springs, anchors, or other designs that limit the amount of the extension of the coils from the rigid material. In some embodiments, there may be more than two tactile elements 401 and 402 that are similarly designed to share a center axis.

In some embodiments, the first coil 410 may be wrapped around the outer side of the first tactile element 401 and the second coil 420 may be wrapped around the outer side of the second tactile element 402. In some embodiments, the first and second coils 410 and 420 may be embedded within groves of their respective tactile elements 401 and 402. In some embodiments, the first and second coils 410 and 420 may have a portion (e.g., the windings) encapsulated or formed within the respective tactile elements 401 and 402. In some embodiments, the leads of the coils (e.g., depicted as the coil ends of 410 of the first coil 410 and as a first end 421 and the second end 422 of the second coil 420) may protrude from an end of the first or second tactile elements. That is, in some embodiments, the first and second tactile elements 401 and 402 may include grooves that are configured to guide the leads of the coil to a distal end 490 of the respective first and second tactile element 401 and 402. In some embodiments, one or both leads may be configured to extend laterally over the windings to the distal end 490 where they may be electrically connected to an element configured to energize the coils. In some embodiments, the element configured to energize the coils is a microcontroller that is also connected to a rigid substrate that is mechanically coupled to a respective magnet and rigid and conductive element.

The first tactile element 401 includes a protruding element 425. The protruding element 425 extends from a proximal end 491 of the first tactile element 401. In this way, when the first coil 410 is energized, a magnetic field caused by a current in the coil causes the first tactile element 401 to move and cause the protruding element 425 to impact or otherwise contact an object. The impact or contact may cause a haptic or tactile sensory response to the corresponding object (e.g., a hand of a user) perhaps in cooperation with other structures or portions of the protruding element 425 not shown. The second tactile element 402 includes a protruding element 415 configured to impact or otherwise contact and generate a tactile or haptic effect on a corresponding object. That is, the protruding element 415 also extends away from the proximal end 491 of the second tactile element 402 such that when the second coil 420 is energized, the second tactile element 402 is sent into motion caused by the magnetic field generated by the energized second coil 420 and causes the protruding element 415 to move and cause contact between the protruding element 415 and the object. In this way, a haptic device may selectively choose which coil to energize in order to cause an intended haptic effect or to cause respective protruding elements to impact or contact an object. In some embodiments, the first tactile element 401 or the second tactile element 402 may include more than one protruding element.

In some embodiments, the haptic device 400 may also include springs (or elastic elements) 402. The springs 402 may be connected to the distal end 490 of the tactile elements. In some embodiments, each tactile element includes multiple springs 402 connected to various portions of the side on the distal end. The springs 402 may be configured to connect to a base (e.g., base or rigid substrate 380 as referenced in FIG. 3) such that the springs pull the respective tactile elements back toward the base (e.g., an initial position) after a coil of the respective tactile element is de-energized. In some embodiments, the initial position of each tactile element causes the respective protruding elements to be recessed within the gap. In some embodiments, the protruding elements extend beyond the gap (e.g., are not recessed) when respective tactile elements are in their initial position (e.g., the springs 402 have pulled the respective tactile element back into the gap). In some embodiments, the springs 402 are designed to limit the amount that each tactile element (and thereby each protruding element) will extend when a respective coil is energized. In some embodiments, the springs 402 are designed to prevent respective tactile elements from spinning.

In some embodiments, the protruding elements are three-dimensional squares or rectangles. In some embodiments, the protruding elements are half spherical shaped. In some embodiments, the protruding elements have rounded edges. In some embodiments, the protruding elements are rubber nubs that extend from the proximal end. In some embodiments, each protruding element has a different size, shape, or ending. In some embodiments, each protruding element may be made from a different material such as to generate different sensory information to a corresponding object (e.g., a hand) based on the texture, density, or abrasiveness of the protruding element. In some embodiments, the positioning of each of the protruding elements may be different or adjustable on respective tactile elements. In some embodiments, each tactile element may have any number of protruding elements.

In some embodiments, one tactile element may have a protruding element configured to contact a first portion of an object (e.g., a first finger of a hand of a user) when a respective coil is energized and another tactile element may have a protruding element configured to contact a second portion of the object (e.g., a second finger of the hand of the user) when a respective coil is energized. In some embodiments, each of the tactile elements may have multiple protruding elements positioned in particular geometric patterns such one or more of tactile elements may be actuated (e.g., by energizing respective coils) to cause particular sensory information such as a symbol of a tactile display to be relayed to a user. In some embodiments, one or more coils may be actuated repeatedly such as to create a vibrating sensation. In some embodiments, one or more of the protruding elements may include two or more sections having adjustable joints between each of the sections such that the one or more protruding elements can be adjusted and be configured to contact different locations of a corresponding object.

In some embodiments, the protruding elements may have brushes or paddles such that, in an embodiment wherein the haptic device is configured to lay on an object, the brushes or paddles create contact with the object in a direction that is parallel to the objects surface. For example, a protruding element that has a brush or paddle may extend from a resting state and move outwardly in a direction that is parallel (e.g., or less than 20 degrees relative) to the surface of an object (e.g., parallel to human skin) such that the brush or paddle create unique haptic sensations on the surface (e.g., the skin). In some embodiments, the haptic device is configured to be positioned such that the protruding element impacts the surface in an orthogonal (e.g., orthogonal or a greater than 20 degree) direction.

Figure 5:
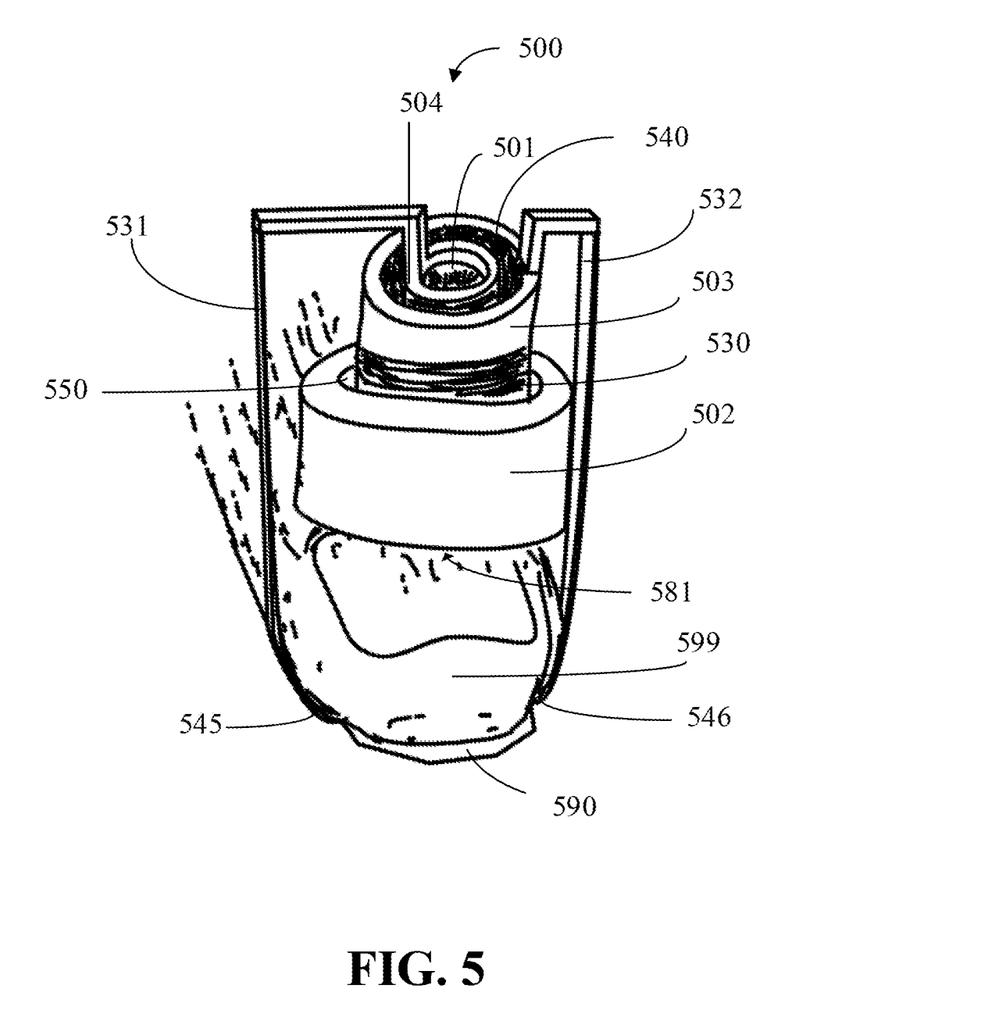
FIG. 5 is an isometric view of a haptic device in accordance with an illustrative embodiment.

Referring now to FIG. 5, an example of a haptic device 500 is shown in accordance with an illustrative embodiment. The haptic device 500 is similar to the haptic devices of FIG. 1 and FIG. 2. The haptic device 500 includes a magnet 501, a rigid and conductive element 502, a first tactile element 503 having a first coil 530 attached thereto, and a second tactile element 504 having a second coil 540 attached thereto. The magnet 501 and the rigid and conductive material 502 are sized and positioned such as to create a gap 550 therebetween. The magnet 501 is configured to generate a magnetic field within the gap 550. The gap 550 is configured or designed such that the first tactile element 503 and the second tactile element 504 may be positioned within the gap and have at least a portion of the windings of their respective coils 530 and 540 also positioned within the gap. In this way, when the first coil 530 is energized, the first tactile element 503 moves as a result of the magnetic field generated by the first coil 530 interfacing with the magnetic field in the gap 550. Similarly, when the second coil 540 is energized, the second tactile element 504 moves as a result of the magnetic field generated by the second coil 540 interfacing with the magnetic field of the gap 550. In some embodiments, more than two tactile elements may be used or implemented.

The first tactile element 503 includes a first protruding element 531 and the second tactile element 504 includes a second protruding element 532. The first protruding element 531 and the second protruding element 532 are designed such that an object 599 (e.g., a finger) may be positioned and held in place between a first side 581 of the rigid and conductive material 502 and a distal end of both the first and second protruding elements. That is, the first protruding element 531 extends away from the first side 581 and wraps around to extend below the first side and extends in parallel to with the first side 581 such as to create a pinch point between a distal end 545 of the first protruding element 531 and the first side 581 of the rigid and conductive material 502. The second protruding element 532 extends away from the first side 581 and wraps around in a direction different than the first protruding element 531 to extend below the first side 581 and extends in parallel to with the first side 581 such as to create a pinch point between the distal end 546 of the second protruding element 532 and the first side 581 of the rigid and conductive material 502. In some embodiments, the pinch point created by the first protruding element 531 is similar to the pinch point created by the second protruding element 532. In this way, an object such as a human finger may be extended through into the pinch points and when a respective tactile element is actuated (e.g., via the energization of a respective coil) the respective tactile element can cause a haptic or tactile effect in a particular location on the object. For example, the first protruding element 531 may cause a haptic effect (e.g., a pinch or vibration) on a left side of the object (e.g., human finger) when the first coil 510 is energized and the second protruding element 532 may cause a haptic effect (e.g., a pinch or vibration) on a right side of the object (e.g., the human figure) when the second coil 520 is energized. In some embodiments, there may be more than one protruding element per tactile element. In some embodiments, there may be more than two tactile elements each having a protruding element affixed thereto. In some embodiments, the location of the generated haptic effect on the object may be include more locations or more particular locations based on the number and design of the protruding elements.

In some embodiments, distal end 545 of the first protruding element 531 and the distal end 546 of the second protruding element 532 are connected such that the connection and the distal ends 545 and 546 create the pinch point with the first side 581 of the rigid and conductive material 502. In some embodiments, the distal ends 545 and 546 may be flexible (e.g., made from a flexible material such as rubber or material having elasticity). In an example where the first protruding element 521 and the second protruding element 532 have distal ends 545 and 546 that are connected via an element 590. In some embodiments, the element 590 may be flexible. In some embodiments, the element 590 may have a surface area that is configured to contact a particular surface of the object 599 (e.g., a pad of the human finger). In some embodiments, the first protruding element 521 and the second protruding element 532 may be selectively actuated in order to create haptic effects that are either parallel or orthogonal with respect to the objects surface. For example, if the first coil 530 and the second coil 540 are actuated with a current that causes them to extend from the rigid and conductive material 502, then the distal ends 545 and 546 may be actuated toward the rigid and conductive material 502 and create an upward or pinching haptic effect on the object (e.g., the human finger). In another example, if the first coil 530 and the second coil 540 are actuated with a current that causes them to recede into the rigid and conductive material 502, then the distal ends 545 and 546 (and/or element 590) may be actuated away the rigid and conductive material 502 and create a releasing haptic effect on the object (e.g., the human finger). In another example, if the first coil 530 is actuated with a current that causes the first coil 530 to extend from the rigid and conductive material 502 and the second coil 540 is actuated with a current that causes the second coil 540 to recede into the rigid and conductive material 502, then the distal end 545 of the first protruding element 531 (and/or element 590) may pinch the object (e.g., the human finger) and the distal end 546 of the second protruding element 532 may release the object (e.g., human finger) creating a first directional haptic effect (e.g., a first directional stretch such as a leftward skin stretch). In another example, if the second coil 540 is actuated with a current that causes the second coil 540 to extend from the rigid and conductive material 502 and the first coil 530 is actuated with a current that causes the first coil 530 to recede into the rigid and conductive material 502, then the distal end 546 of the second protruding element 532 may pinch the object (e.g., the human finger) and the distal end 545 of the first protruding element 531 may release the object (e.g., human finger) creating a second directional haptic effect (e.g., a second directional stretch such as a rightward skin stretch via the element 590).

Figure 6:
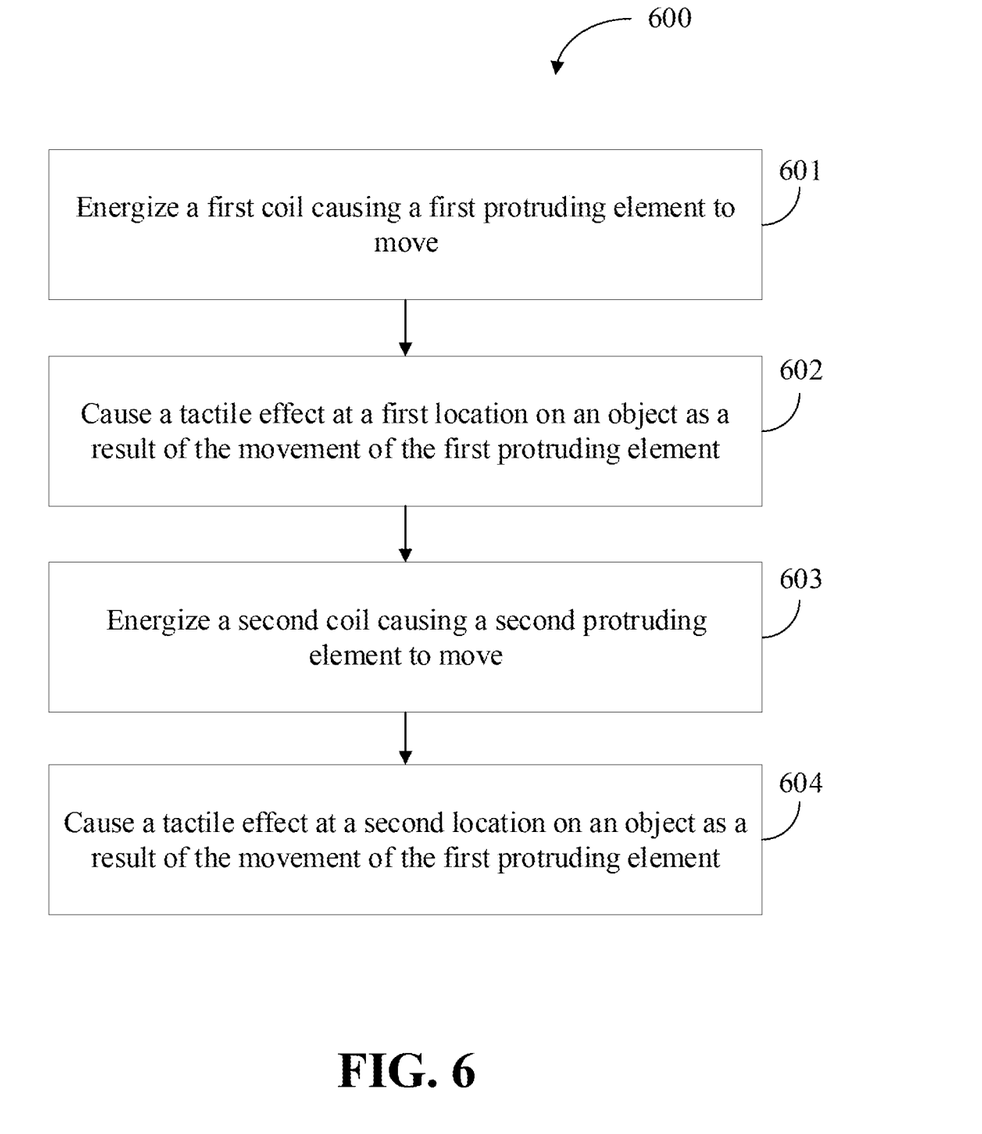
FIG. 6 is a flow diagram of a method of providing haptic feedback in accordance with an illustrative embodiment.

Referring now to FIG. 6, a flow diagram of a method 600 of providing haptic feedback is shown in accordance with an illustrative embodiment. In an operation 601, a first coil is energized causing a first protruding element to move relative to the haptic device. For example, processing circuitry 102 (e.g., an element thereof) may determine that the first coil is to be energized based on a determination that a first haptic effect should be generated. The processing circuitry 102 may then cause a current to flow through a first coil that is affixed or mechanically coupled to the first protruding element. The current through the first coil causes a magnetic field to be generated and interact with a magnetic field generated around the first coil from a different source. In some embodiments, the magnetic field generated around the first coil is generated by a permanent magnet. In some embodiments, the first coil has an initial position within a gap defined by the magnet and a rigid and conductive element. The magnetic field generated by the energized coil causes the coil and first protruding element to move. A spring or elastic structure may be connected between the first coil and a base or position on the rigid and conductive material. The spring or elastic structure may be configured to prevent the first coil (and thereby the first protruding element) from spinning or to keep the first coil centered within the gap. In some embodiments, the spring or elastic structure may be designed to prevent the protruding element and first coil from moving or extending too far such as to dis-align the various components of the haptic device. Additionally or alternatively, the spring or elastic structure may cause the first coil to move back to the initial position (e.g., a recessed position within the gap) once the first coil de-energized. In some embodiments, the first coil may be energized and de-energized repeatedly to create a different tactile effect (e.g., a vibration).

In an operation 602, a tactile effect is generated at a first location of an object as a result of the movement of the first protruding element. In some embodiments, the movement of the first protruding element causes the first protruding element to orthogonally (e.g., +/−15 degrees of orthogonal) impact a surface of the object at the first location. In some embodiments, the movement of the first protruding element causes the first protruding element to make contact with a surface of the object at the first location in a substantially parallel (e.g., less than 20 degrees) manner. The exact angle of impact or type of contact may be based on particular applications or particular desired haptic effects. In some embodiments, the first protruding element may impact the skin of a user such as to convey a first symbol of a tactile display (e.g., a portion of a symbol of a tactile display) to the user. In some embodiments, the tactile effect is a vibration at the first location. In some embodiments, the protruding element may be a paddle that causes a sliding sensation as the paddle is moved over the skin.

In an operation 603, a second coil is energized causing a second protruding element to move relative to the haptic device. For example, processing circuitry 102 or an element thereof may determine that the second coil is to be energized based on a determination that a second or different haptic effect should be generated via the haptic device. The processing circuitry 102 may then cause a current to flow through the second coil that is mechanically coupled to the second protruding element. The second protruding element is positioned in a different location than the first protruding element such that the second protruding element is designed to contact a different location on the object (assuming the object is stationary) than the first protruding element. The current through the second coil causes a magnetic field to be generated and interact with the magnetic field generated around the first coil and the second coil. Similar to above, in some embodiments, the magnetic field generated around the first coil and the second coil is generated by a permanent magnet. In some embodiments, the first coil and the second coil have an initial position within a gap defined by the magnet and a rigid and conductive element. The magnetic field generated by the energized second coil causes the coil and second protruding element to move. A spring or elastic structure may be connected to the second coil and a base or position on the rigid and conductive material. The spring or elastic structure may be configured to or designed to prevent the second coil (and thereby the second protruding element) from spinning or to keep the second coil centered within the gap. In some embodiments, the spring or elastic structure may prevent the second protruding element and second coil from moving or extending too far such as to dis-align the various components of the haptic device. Additionally or alternatively, the spring or elastic structure may cause the second protruding element to move back to an initial position (e.g., a recessed position) once the second coil de-energized. In some embodiments, the second coil may be energized and de-energized repeatedly to create a different tactile effect (e.g., a vibration).

In an operation 604, a tactile effect is generated at a second location of the object as a result of the movement of the second protruding element. In some embodiments, the movement of the second protruding element causes the first protruding element to orthogonally (e.g., +/−15 degrees of orthogonal) impact a surface of the object at the second location. In some embodiments, the movement of the second protruding element causes the second protruding element to make contact with a surface of the object at the first location in a substantially parallel (e.g., less than 20 degrees) manner. The exact angle of impact or type of contact may be based on particular applications or particular desired haptic effect of the second coil and second protruding element. In some embodiments, the second protruding element may impact the skin of a user such as to convey a second symbol of a tactile display (e.g., a portion of a symbol of a tactile display) to the user. In some embodiments, the tactile effect is a vibration at the second location.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   a magnet;
   material arranged with respect to the magnet so as to create a gap, and configured such that a magnetic field is generated in the gap by the magnet, the material and the magnet sharing a center axis;
   a plurality of tactile elements, each of the plurality of tactile elements sharing the center axis; and
   a plurality of coils in the gap, at least one coil of the plurality of coils configured to wrap around at least one of a tactile element of the plurality of tactile elements,
   wherein each of the plurality of coils is connected to a respective one of a plurality of protruding elements, each of the plurality of protruding elements being configured to produce a respective contact with an object when the respective coil is energized.

2. The device of claim 1, wherein each coil is comprised of an electrically-conductive wire that is spooled into a cylindrical shape.

3. The device of claim 2, wherein each coil is secured by a centering mechanism that is configured to cause the coil to move axially in the gap when it is energized with respect to the cylindrical shape.

4. The device of claim 3, wherein the plurality of coils are arranged coaxially together in the gap.

5. The device of claim 1, wherein each coil is configured to be energized independently of the other coils.

6. The device of claim 1, wherein the object is a person, and wherein the respective contact is contact with respective locations on the person.

7. The device of claim 1, wherein the object is a person, and wherein the respective contact is a contact that is substantially orthogonal to a respective location on the person's skin.

8. The device of claim 1, wherein the object is a person, and wherein the respective contact is a contact that is substantially parallel to a respective location on the person's skin.

9. A method of operating a device having a magnet, material arranged with respect to the magnet so as to create a gap, and configured such that a magnetic field is generated in the gap by the magnet, the material and the magnet sharing a center axis, a plurality of tactile elements, each of the plurality of tactile elements sharing the center axis, and a plurality of coils in the gap, at least one coil of the plurality of coils configured to wrap around at least one of a tactile element of the plurality of tactile elements wherein each of the plurality of coils is connected to a respective one of a plurality of protruding elements, the method comprising:

energizing a first one of the plurality of coils so as to cause a first one of the plurality of protruding elements to produce a first respective contact with an object; and
energizing a second one of the plurality of coils so as to cause a second one of the plurality of protruding elements to produce a second respective contact with the object.

10. The method of claim 9, wherein each coil is comprised of an electrically-conductive wire that is spooled into a cylindrical shape.

11. The method of claim 10, wherein each coil is secured by a centering mechanism that is configured to cause the coil to move axially in the gap when it is energized with respect to the cylindrical shape.

12. The method of claim 11, wherein the plurality of coils are arranged coaxially together in the gap.

13. The method of claim 9, wherein the object is a person, and wherein the respective contact is contact with respective locations on the person.

14. The method of claim 9, wherein the object is a person, and wherein the respective contact is a contact that is substantially orthogonal to a respective location on the person's skin.

15. The method of claim 9, wherein the object is a person, and wherein the respective contact is a contact that is substantially parallel to a respective location on the person's skin.

16. A wearable device comprising:
   a magnet;
   material arranged with respect to the magnet so as to create a gap, and configured such that a magnetic field is generated in the gap by the magnet, the material and the magnet sharing a center axis;
   a plurality of tactile elements, each of the plurality of tactile elements sharing the center axis; and
   a plurality of coils in the gap, at least one coil of the plurality of coils configured to wrap around at least one of a tactile element of the plurality of tactile elements,
   wherein each of the plurality of coils is connected to a respective one of a plurality of protruding elements, each of the plurality of protruding elements being configured to produce a respective contact with a person wearing the device when the respective coil is energized.

17. The wearable device of claim 16, wherein the respective contacts are configured to produce a contact at respective locations on the person.

18. The wearable device of claim 16, wherein the respective contact is a contact that is substantially orthogonal to a respective location on the person's skin.

19. The wearable device of claim 16, wherein the respective contact is a contact that is substantially parallel to a respective location on the person's skin.

20. The wearable device of claim 16, wherein the respective contact is a vibration produced on respective locations on the person.

* * * * *